3,054,778
ACETIC ANHYDRIDE MODIFIED
POLYURETHANE
Charles R. Honea, Claude A. Latta, and Elmer L. Pendleton, all of Lake Jackson, Tex., assignors to The Dow Chemical Company, Midland, Mich., a corporation of Delaware
No Drawing. Filed Oct. 19, 1959, Ser. No. 847,079
2 Claims. (Cl. 260—77.5)

This invention relates to new water-soluble isocyanate-modified polyoxyethylene glycols and to methods for their production.

It is well known to make cross-linked, insoluble and infusible polyurethane resins by the reaction of diisocyanates with polyoxyalkylene glycols. The products of the present invention differ from these prior products in that they are soluble, fusible, extensible, orientable and film forming and color-stable.

According to the invention, polyoxyethylene glycol, or a polyoxyalkylene glycol that is water-soluble and consists predominantly of oxyethylene groups, is reacted with an organic diisocyanate in proportions and under conditions such that a substantially linear, water-soluble film-forming orientable polyglycol-polyurethane resin having high tensile strength and elongation is produced. As an optional though preferred feature, the resin thus produced can be color-stabilized by reaction with an organic acid or acid anhydride.

In order to attain a high tensile strength and ultimate elongation in a water-soluble, film-forming orientable resin, the polyoxyalkylene glycol should have a molecular weight of at least about 4000 and the molar ratio of diisocyanate to glycol should be about 0.8–3, and preferably about 1–2.

The reaction between the glycol and the diisocyanate is greatly accelerated by the presence of an alkaline catalyst. Suitable catalysts include the alkali metal hydroxides, carbonates and acetates, tertiary amines, and the like. Since the polyoxyalkylene glycols are ordinarily made by use of an alkaline catalyst, it is convenient to leave this catalyst in the glycol to be used in the practice of the present invention, thus utilizing this catalyst both in producing the glycol and in reacting it with diisocyanate.

The glycol-diisocyanate reaction proceeds quite slowly at ordinary temperatures; hence it is generally desirable to use an elevated temperature. However, the product may be adversely affected by temperatures above 150° C., hence the reaction temperature is ordinarily about 25–150° C., and preferably about 60–100°.

The diisocyanates useful in practicing the invention include phenylene and tolylene diisocyanate alkylene-bis(phenylisocyanate), hexamethylenediisocyanate and, in general, any diisocyanate useful in making urethane resins.

The practice of the invention is illustrated by the following examples.

*Example 1*

One hundred parts of polyoxyethylene glycol of mol. wt. 20,000, containing 500 p.p.m. Na+ from the weakly basic catalyst $NaC_2H_3O_2$, and 1200 parts of benzene were placed in a dry reaction vessel equipped with stirrer and heating device. Water was removed by distillation. 1.3 parts of tolylene diisocyanate was then put into the reaction mixture and the temperature was raised to 80° and held for 1½ hours. The resulting polymer when separated from benzene and dried, had a tensile strength of 3,500–4,000 lbs./sq. in. before orientation. After orientation of the polymer, the tensile strength averaged about 30,000 lbs./sq. in. based on the cross-section of the oriented sample. Oriented elongation was about 400 percent. Total elongation was about 1000 percent. It readily formed fibers and films. The polymer was soluble in water.

*Example 2*

One hundred parts of polyethylene glycol of mol. wt. 9000, containing 500 p.p.m. of sodium ion as acetate, and 1200 parts of benzene were placed in a dry reaction vessel equipped with stirrer and heating device. Water was removed by distillation. Three parts of tolylene diisocyanate was then put into the reaction mixture and the temperature was raised to 80° C. and held for 1½ hours. The resulting polymer, when separated from the benzene and dried, has a tensile strength of 2000 to 2500 lbs./sq. in. before orientation. After orientation, it has a tensile strength of about 22,000 lbs./sq. in. Elongation of oriented polymer was about 400 percent. Its other properties were quite similar to those of the product of Example 1.

*Example 3*

Example 3 is similar to Examples 1 and 2 except that after the polymerization at 80° for 1½ hours two molar proportions of acetic anhydride, based on the diisocyanate, was added to the reaction mixture. The reaction was rapid and approximately 30 minutes was sufficient. The physical characteristics of the polymer were similar to those of the previous examples. However, the aging characteristics, that is, in maintaining the physical properties and color stability, were greatly improved.

The resins of the invention are useful as warp-sizing agents, flocculating agents in aqueous media and for the production of films and fibers.

We claim:
1. A process for making a water-soluble, orientable, fiber- and film-forming resin comprising reacting a polyoxyalkylene glycol of molecular weight at least about 4000 and consisting predominantly of oxyethylene radicals with about 0.8 to 3 molar equivalents of an organic diisocyanate and reacting the thus formed intermediate resin with about 1 to 2 molar proportions, based on the diisocyanate, of acetic anhydride.
2. The resin produced by the process of claim 1.

References Cited in the file of this patent
UNITED STATES PATENTS

| | | |
|---|---|---|
| 2,692,873 | Langerak et al. | Oct. 26, 1954 |
| 2,734,045 | Nelson | Feb. 7, 1956 |
| 2,948,691 | Windemuth | Aug. 9, 1960 |

FOREIGN PATENTS

| | | |
|---|---|---|
| 538,843 | Canada | Mar. 26, 1957 |
| 733,624 | Great Britain | July 13, 1955 |